(12) United States Patent
Zhang et al.

(10) Patent No.: US 7,624,415 B1
(45) Date of Patent: Nov. 24, 2009

(54) TECHNIQUES FOR OPTIMIZING USE OF CHANNEL BANDWIDTH IN ON-DEMAND CONTENT DELIVERY SYSTEMS

(75) Inventors: WeiMin Zhang, San Jose, CA (US); Jeremy Woodburn, San Francisco, CA (US)

(73) Assignee: Broadlogic Network Technologies Inc., San Jose, CA (US)

( * ) Notice: Subject to any disclaimer, the term of this patent is extended or adjusted under 35 U.S.C. 154(b) by 720 days.

(21) Appl. No.: 10/420,547

(22) Filed: Apr. 17, 2003

Related U.S. Application Data

(60) Provisional application No. 60/374,762, filed on Apr. 22, 2002.

(51) Int. Cl.
*H04N 7/173* (2006.01)

(52) U.S. Cl. .............................. 725/95; 725/86; 725/87; 725/97

(58) Field of Classification Search ............ 725/86–104
See application file for complete search history.

(56) References Cited

U.S. PATENT DOCUMENTS

| | | | | |
|---|---|---|---|---|
| 5,682,597 A * | 10/1997 | Ganek et al. ............... | 455/3.04 |
| 5,729,280 A * | 3/1998 | Inoue et al. .................. | 725/101 |
| 6,018,359 A * | 1/2000 | Kermode et al. ............. | 725/101 |
| 7,024,679 B1 * | 4/2006 | Sie et al. ...................... | 725/101 |
| 7,089,577 B1 * | 8/2006 | Rakib et al. ................... | 725/87 |
| 7,111,316 B1 * | 9/2006 | Zahorjan et al. .............. | 725/97 |
| 2002/0107968 A1 * | 8/2002 | Horn et al. .................. | 709/230 |
| 2003/0037331 A1 * | 2/2003 | Lee .............................. | 725/32 |
| 2003/0140348 A1 * | 7/2003 | Stewart ....................... | 725/101 |
| 2005/0033856 A1 * | 2/2005 | Li .............................. | 709/231 |

\* cited by examiner

*Primary Examiner*—John W Miller
*Assistant Examiner*—Omar Parra
(74) *Attorney, Agent, or Firm*—Townsend and Townsend and Crew LLP; Kenneth R. Allen

(57) ABSTRACT

A system for optimizing bandwidth of a video-on-demand system is provided. According to one aspect of the system, upon receiving a request from a first subscriber for a program, the system delivers the program to the first subscriber via a first communication channel. Upon receiving a request from a second subscriber for the same program, the system delivers only a beginning portion of the program to the second subscriber via a second communication channel and at the same time records a remaining portion of the program from the first communication channel. At the appropriate time, the recorded remaining portion of the program are shown to the second subscriber.

31 Claims, 3 Drawing Sheets

Once Stream 2 starts, User2 can record from Stream 1 and User3 can record from Streams 1 and 2

Once Stream 2 starts, User2 can record from Stream 1 and User3 can record from Streams 1 and 2

TECHNIQUES FOR OPTIMIZING USE OF CHANNEL BANDWIDTH IN ON-DEMAND CONTENT DELIVERY SYSTEMS

CROSS-REFERENCES TO RELATED APPLICATION(S)

The present application claims the benefit of priority under 35 U.S.C. § 119 from U.S. Provisional Patent Application Ser. No. 60/374,762 entitled "MULTI-CHANNEL ON-DEMAND SYSTEM", filed on Apr. 22, 2002, the disclosure of which is hereby incorporated by reference in its entirety for all purposes.

BACKGROUND OF THE INVENTION

The present invention generally relates to content delivery systems. More specifically, the present invention relates to a method and system for optimizing use of channel bandwidth in on-demand systems.

Traditional digital cable, satellite and terrestrial broadcast systems include many frequency division multiplexed radio frequency (RF) channels. Typical on-demand services, such as video-on-demand and stream media through cable network or satellite systems, are often limited by the hard frequency limitations, as shown in FIG. 1, where each subscriber is tuned to a certain frequency band to receive the desired content. For a true on-demand system, very often, there are multiple copies of the same content flowing through the network with slight time differences. As shown in FIG. 1, at beginning of the service, a subscriber sends in a request for a desired service. In response, the network allocates part of one RF channel for the service requested. If there are multiple users requesting the same content at different times, then very often, there are multiple copies of the same content being delivered on different RF channels at the same time.

FIG. 2 is a simplified schematic diagram illustrating delivery of content streams in a conventional video-on-demand system. Referring to FIG. 2, a typical video-on-demand system includes a network center that controls delivery of audio/video (A/V) content streams to subscribers. A subscriber can be located in one of many possible locations, such as, a home or residence. Each subscriber location is connected to the network center via a communication channel. In a standard video-on-demand system, each subscriber needs one content stream, which is limited with one RF channel. Each RF channel, however, is able to support multiple content streams. When a particular program is requested by a first subscriber, the network center causes an A/V content stream representing the requested program to be sent to the first subscriber's location via a corresponding RF channel. When the same program is requested by a second subscriber at a later time, the network center again causes a second A/V content stream representing the same requested program to be sent to the second subscriber's location via a corresponding RF channel.

The foregoing typical video-on-demand system suffers from content stream redundancy. When the same program is requested by different subscribers at different times, various RF channels are then needed to carry the same A/V content streams (the only difference between two content streams being that they are time-shifted versions) which results in inefficient use of the communication channel bandwidth. This inefficiency becomes further exacerbated as more and more A/V content streams representing the same content need to be delivered. As a result, an increasingly higher percentage of the total available bandwidth within all the RF channels is utilized to carry the same content.

Furthermore, in a traditional system, contents for a single program are delivered via a single corresponding channel. Therefore, each on-demand subscriber is only able to view one on-demand channel at a time, even if there is excess capacity available in other RF channels. Consequently, excess capacity that is available in other RF channels cannot be utilized by the on-demand subscriber.

Hence, it would be desirable to provide a method and system that is capable of optimizing channel bandwidth in a content delivery system.

BRIEF SUMMARY OF THE INVENTION

A method and system for optimizing bandwidth of a video-on-demand system is provided. According to one exemplary aspect of the system, upon receiving a request from a first subscriber for a program, the system delivers the program to the first subscriber via a first communication channel. Upon receiving a request from a second subscriber for the same program, the system delivers only a beginning portion of the program to the second subscriber via a second communication channel and at the same time records a remaining portion of the program from the first communication channel. At the appropriate time, the recorded remaining portion of the program are shown to the second subscriber.

The system provides a number of benefits and advantages. For example, since the remaining portions of the program are recorded, there is no need to transmit such portions over the second communication channel. As a result, redundant contents are not transmitted and more bandwidth is rendered available.

According to another exemplary aspect of the system, the available bandwidth is dynamically allocated over multiple channels to improve system efficiency. For example, contents for a single program are divided and then transmitted over multiple channels which have available bandwidth.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

DETAILED DESCRIPTION OF THE INVENTION

Figure 3:
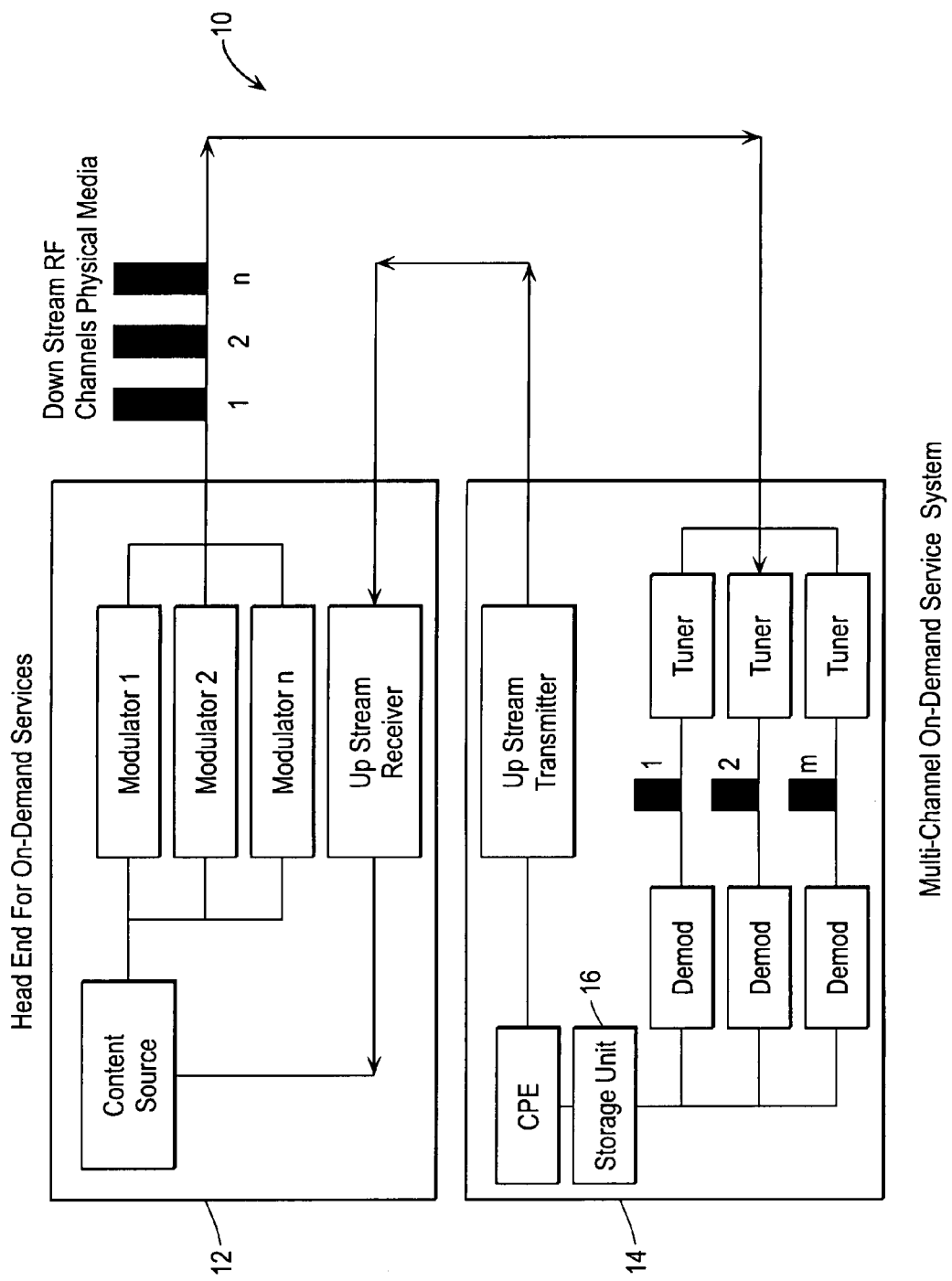
FIG. 3 is a simplified schematic block diagram illustrating an exemplary embodiment of the present invention.

The present invention in the form of one or more exemplary embodiments will now be described. FIG. 3 illustrates an exemplary embodiment of the present invention. Referring to FIG. 3, there is shown a multi-channel on-demand service system 10. The system 10 includes a network center or head end 12 and customer premises equipment (CPE) 14. The head end 12 is connected to the CPEs 14 positioned at various subscriber locations. The head end 12 is capable of transmitting multiple content streams via corresponding RF communication channels. The CPE 14 is able to receive and handle multiple content streams transmitted from the head end 12. The ability to handle multiple content streams from multiple channels can be implemented in a number of ways. For example, in one exemplary implementation, multiple demodulators and tuners can be used to handle corresponding RF channels; in another exemplary implementation, a single demodulator is able to handle multiple content streams or channels. An example of a multi-channel demodulator is described in co-owned and co-pending non-provisional U.S. patent application Ser. No. 09/956,479, filed on Sep. 18, 2001, entitled "A Digital Implementation of Multi-Channel Demodulators," (issued Mar. 9, 2004 as U.S. Pat. No. 6,704,372) which is hereby incorporated by reference for all purposes. As will be further described below, the ability of the CPE 14 to handle multiple content streams allows the system 10 to minimize transmission of redundant contents over its channels. Furthermore, the CPE 14 includes a storage unit 16. In one exemplary embodiment, the storage unit is a hard disk. The storage unit 16 is used to store data from one or more of the multiple content streams, as will be further described below.

The system 10 operates in the following exemplary manner to optimize use of the communication channel bandwidth. The system 10 minimizes transmission of redundant contents over its RF channels. More specifically, the CPE 14 monitors the multiple content streams that it receives from the head end 12 and, if appropriate, records one or more desired content streams, or portions thereof, for future use by a subscriber. By recording the desired content stream(s) for subsequent use, redundant transmission of the same content stream from the head end 12 is minimized thereby allowing the system 10 to achieve better bandwidth utilization.

The following illustrates an exemplary situation in which the system 10 optimizes use of its channel bandwidth. In this illustrative instance, when a first subscriber wishes to initiate a desired service, such as viewing of a particular program, the first subscriber forwards a request for service to the system 10. The head end 12, in response, causes a first A/V content stream representing the requested program to be delivered via the corresponding RF channel at time $t_1$. At time $t_2$, which equals to a time period "y" after time $t_1$, a second subscriber requests the same program as previously requested by the first subscriber. This time, the head end 12 only causes a portion of the A/V content stream representing the requested program to be delivered to the CPE 14 located at the second subscriber location. More specifically, only that portion of the A/V content stream covered during the period from the beginning of the A/V content stream to time period "y" is sent by the head end 12 to the second subscriber. Concurrently, at time $t_2$, the CPE 14 located at the second subscriber also starts to record the first A/V content stream. This recorded A/V content stream is then displayed by the CPE 14 to the second subscriber at the appropriate time.

Viewed from an alternative perspective, upon receiving the request from the second subscriber, the system 10 checks to see if other portions of the same content stream corresponding to the requested program are being transmitted over one or more of its channels at the same time. For example, in the video-on-demand case, when the subscriber orders and starts to view movie "x", his/her CPE 14 can also concurrently search other channels to find out whether other subscribers are simultaneously watching different portions of the same movie "x". What that means is that these subscribers started viewing movie "x" at various earlier times. If other subscribers are simultaneously watching different portions of movie "x", this subscriber can start to record these other portions of movie "x" and later replay these other portions for viewing. Thus, the system 10 does not have to transmit those portions of movie "x" again.

Figure 1:
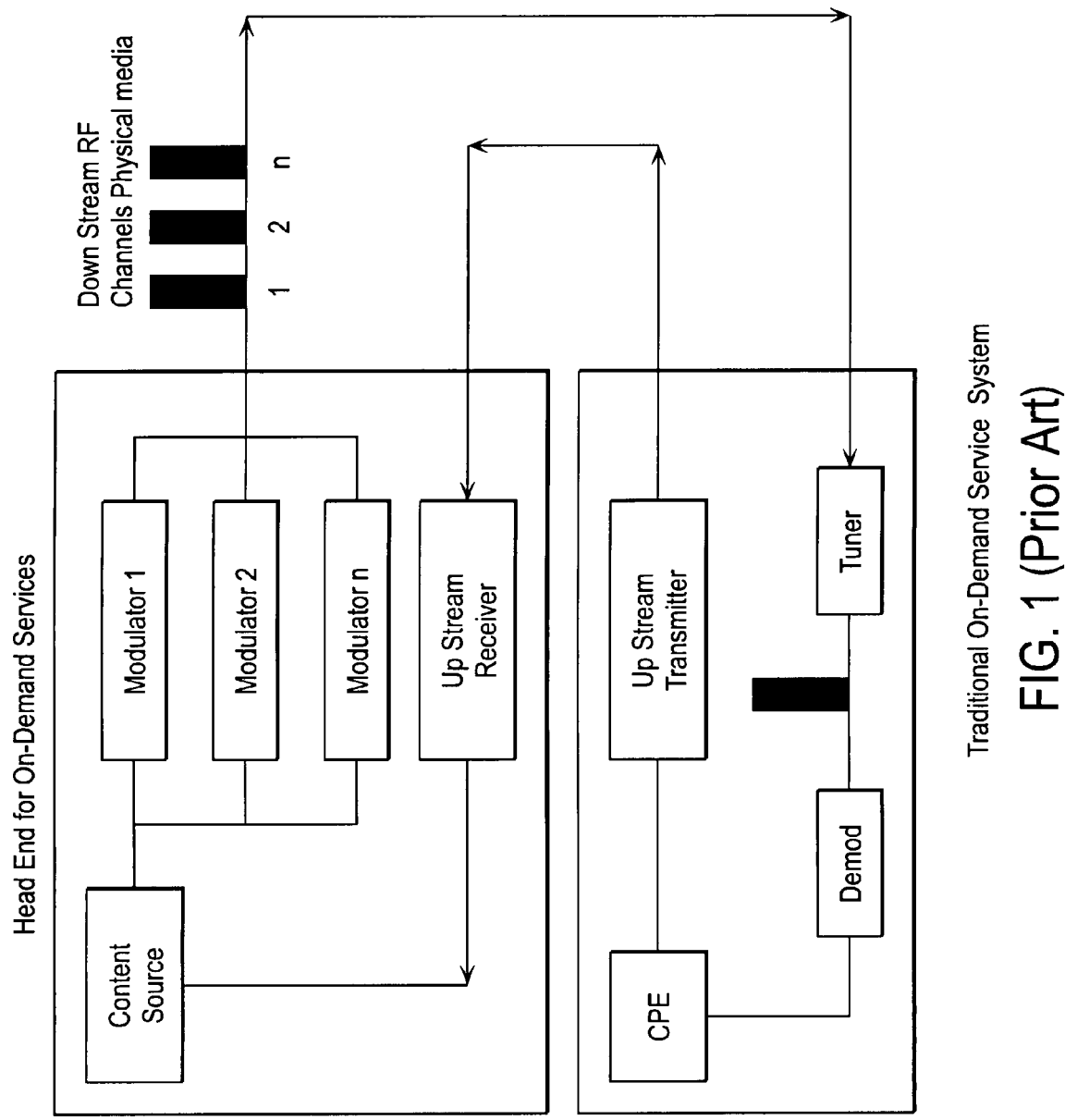
FIG. 1 is a simplified schematic block diagram illustrating a traditional on-demand service system.
Figure 2:
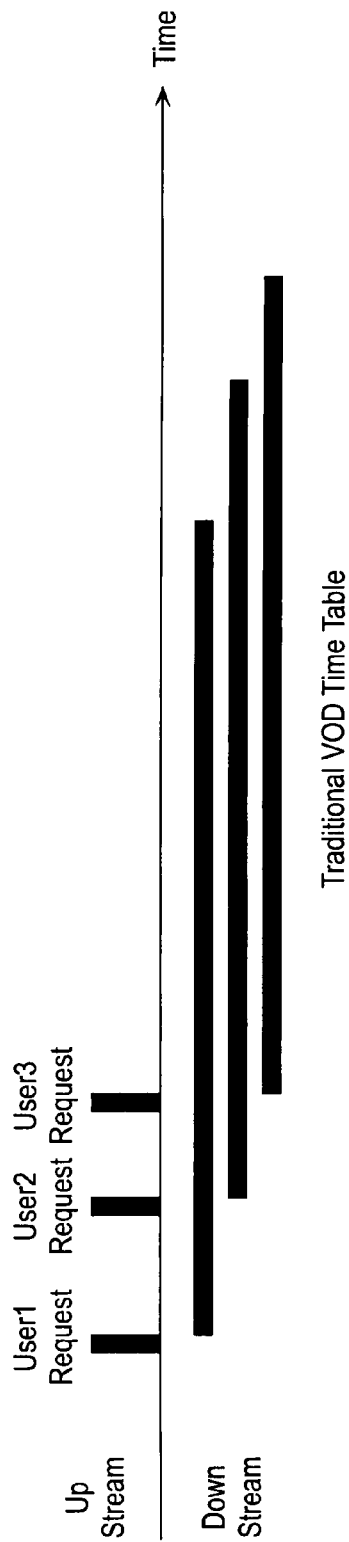
FIG. 2 is a simplified schematic diagram illustrating delivery of content streams in a conventional video-on-demand system.
Figure 4:
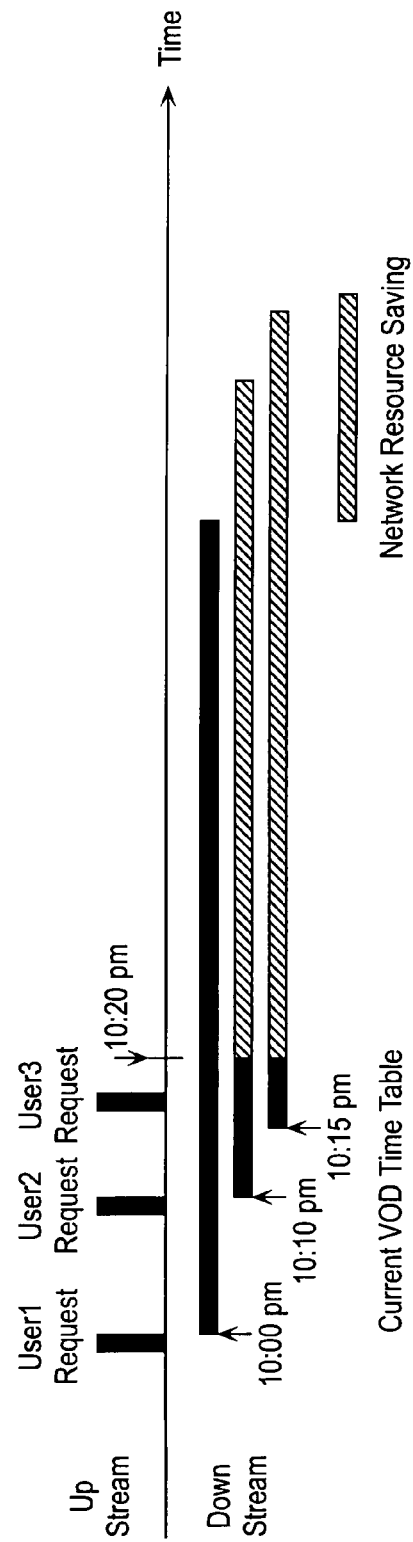
FIG. 4 is a simplified schematic diagram illustrating delivery of content streams by an exemplary embodiment of a multi-channel on-demand service system in accordance with the present invention.

The following is an illustrative example that further demonstrates the exemplary operation of the system 10 as described above. Referring to FIG. 4, at 10 p.m., a first subscriber requests movie #1. Movie #1 is delivered to the first subscriber in the form of a first content stream via a first RF channel. At 10:10 p.m., the system 10 receives a request from a second subscriber for the same movie, movie #1. Upon receiving this second request, the system 10 delivers the first ten (10) minutes of movie #1 to the second subscriber in the form of a second content stream via a second RF channel and, at the same time, directs remaining portions of movie #1, which is being shown to the first subscriber, to be recorded from the first content stream. The recorded remaining portions of movie #1 can be stored in a hard disk in the CPE 14. At 10:20 p.m., after the first ten (10) minutes of movie #1 has been shown to the second subscriber, the remaining portions of movie #1 are retrieved from the hard disk and then shown using contents that were previously recorded from the first content stream. Hence, only a 10-minute portion of movie #1 need to be transmitted over the second RF channel. The remaining portions of movie #1 can be retrieved from the hard drive and delivered to the second subscriber without using any bandwidth on the second RF channel. It should be understood that while the foregoing description is directed to two requests for the same content, the present invention can similarly be applied to accommodate multiple requests. Based on the disclosure provided herein, a person of ordinary skill in the art should be able to apply the present invention to various situations. For example, a third subscriber may request movie #1 at 10:30 p.m. At this time, A/V contents can be recorded from both the first and second content streams for subsequent viewing by the third subscriber. Based on the disclosure and teachings provided herein, it will be appreciated by a person of ordinary skill in the art that multiple content streams can be used to reduce redundant transmission of the same content thereby increasing available bandwidth.

It should also be noted that the a program can be broken up into multiple content streams and transmitted over multiple channels. In the situation where the program is transmitted over multiple channels, the corresponding multiple content streams from multiple channels are recorded if and when a subsequent request for the same program is issued.

Optionally, since the first few minutes of a program are broadcasted more often, video clips or contents representing these first few minutes can be pre-stored in a user hard disk or storage unit, thereby further improving system quality and efficiency.

Furthermore, the system 10 can also be used to manage available bandwidth in an efficient manner. As mentioned above, the CPE 14 is able to handle multiple RF channels. On occasions, not all RF channels are fully utilized. When an RF channel is not utilized, bandwidth becomes available. Such available bandwidth can be dynamically allocated by the system 10 to permit more efficient bandwidth utilization. Contents for a single program can be divided and then transmitted over multiple RF channels to the CPE 14. Upon receiving the corresponding content streams from the multiple RF channels, the CPE 14 collects and assembles all the contents for the single program and displays the single program to the subscriber.

The following illustrates one exemplary situation in which the system 10 is able to more efficiently utilize available bandwidth. As an example, assuming the video-on-demand service peak hour happens at 8:00-9:00 p.m. The system 10 has excess or available bandwidth across one or more channels before 8:00 p.m., for example, at 7:45 p.m. Since excess bandwidth is available, the system 10 transmits all the contents that a subscriber needs across the one or more channels before 8:00 p.m., thereby optimizing the system overall throughput and reducing potential congestion.

Furthermore, according to the present invention, an exemplary embodiment of the system 10 can be utilized to receive multiple video-on-demand streams at the same time as well as for high speed delivery of video-on-demand programs. While the foregoing description is provided in the context of delivering an A/V program, it will be appreciated by a person of ordinary skill in the art that the present invention can be applied to other types of programs in different applications.

It should be understood that the present invention as described above can be realized in the form of control logic, implemented in software or hardware or a combination of both, in either an integrated or distributed manner. A person of ordinary skill in the art will know of other ways and/or methods to implement the present invention.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A system for optimizing utilization of bandwidth in a content delivery system, comprising:
    a head end configured to transmit a plurality of programs via a plurality of communication channels; and
    a plurality of customer premises equipment each configured to receive the plurality of programs transmitted via the plurality of communication channels from the head end;
    wherein upon receiving a first request for a first program from a first subscriber, the first program having a beginning and an end,
        the head end transmits the first program via a first communication channel to the customer premises equipment associated with the first subscriber;
        the head end determines whether there is any excess bandwidth in the content delivery system from one or more communication channels other than the first communication channel;
        the head end breaks up the first program based on a determination that there is excess bandwidth in the content delivery system from the one or more communication channels and transmits the first program collectively over multiple communication channels including the first communication channel and the one or more communication channels that have excess bandwidth; and
    wherein upon receiving a second request for the first program from a second subscriber, the head end transmits via at least a second communication channel to the customer premises equipment associated with the second subscriber a portion of the first program, the portion being from the beginning of the first program to a point in the program corresponding to the time that the second request is received, and directs the customer premises equipment associated with the second subscriber to record, from the multiple communication channels upon which the first program is transmitted, the remaining portion of the first program, the remaining portion being from the point in the first program corresponding to the time the second request is received to the end of the first program.

2. The system of claim 1 wherein each of the plurality of customer premises equipment includes a storage unit; and
    wherein the storage unit of the customer premises equipment associated with the second subscriber is used to store the recorded remaining portion of the first program.

3. The system of claim 2 wherein the storage unit is a hard disk.

4. The system of claim 1 wherein upon completion of providing the beginning portion of the first program to the second subscriber, the remaining portion of the first program is subsequently provided to the second subscriber.

5. The system of claim 1 wherein the plurality of programs include an audio/video program.

6. The system of claim 1 wherein the plurality of communication channels include at least one RF channel.

7. The system of claim 1 wherein the second request is issued after the first request.

8. A system for optimizing utilization of bandwidth in a content delivery system, comprising:
    a head end configured to transmit a plurality of programs via a plurality of communication channels; and
    a plurality of customer premises equipment each configured to receive the plurality of programs transmitted via the plurality of communication channels from the head end;
    wherein:
        upon receiving a request for a desired program from a subscriber, the head end checks whether the desired program is being transmitted via a subset of the plurality of communication channels, the desired program having a beginning and an end;
        based on the check of whether the desired program is being transmitted via a subset of the plurality of communication channels, the head end transmits a portion of the desired program, from the beginning of the desired program to a point in the desired program corresponding to the time the request is received, via a second different subset of the plurality of communication channels to the customer premises equipment associated with the subscriber and directs the customer premises equipment associated with the subscriber to record the remaining portion of the desired program, the remaining portion being from the point in the desired program corresponding to the time the second request is received to the end of the desired program, from the subset of the plurality of communication channels that has been determined as currently transmitting the desired program; and
        the head end breaks up the desired program based upon a determination that there is excess bandwidth in the content delivery system from multiple communication channels and transmits the desired program collectively over the multiple communication channels having the excess bandwidth.

9. The system of claim 8 wherein each of the plurality of customer premises equipment includes a storage unit; and
    wherein the storage unit of the customer premises equipment associated with the subscriber is used to store the recorded remaining portion of the desired program.

10. The system of claim 9 wherein the storage unit is a hard disk.

11. The system of claim 8 wherein upon completion of providing the beginning portion of the desired program to the subscriber, the remaining portion of the desired program is subsequently provided to the subscriber.

12. The system of claim 8 wherein the plurality of programs include an audio/video program.

13. The system of claim 8 wherein the plurality of communication channels include at least one RF channel.

14. A method for optimizing utilization of bandwidth in a content delivery system, the content delivery system having a head end configured to transmit a plurality of programs via a plurality of communication channels and a plurality of customer premises equipment each configured to receive the plurality of programs transmitted via the plurality of communication channels from the head end, the method comprising:
receiving a first request for a first program from a first subscriber;
in response to the first request, directing the head end to determine whether there is any excess bandwidth in the content delivery system from one or more communication channels other than a first communication channel;
based on a determination that there is excess bandwidth in the content delivery system from the one or more communication channels, directing the head end to break up the first program and transmit the first program collectively over multiple communication channels including the first communication channel and the one or more communication channels that have excess bandwidth to the customer premises equipment associated with the first subscriber;
receiving a second request for the first program from a second subscriber; and
in response to the second request, directing the head end to transmit a portion of the first program, from the beginning of the first program to a point in the program corresponding to the time the second request is received, via at least a second communication channel to the customer premises equipment associated with the second subscriber and directing the customer premises equipment associated with the second subscriber to record the remaining portion of the first program from the multiple communication channels.

15. The method of claim 14, wherein each of the plurality of customer premises equipment includes a storage unit, and further comprising:
using the storage unit of the customer premises equipment associated with the second subscriber to store the recorded remaining portion of the first program.

16. The method of claim 15 wherein the storage unit is a hard disk.

17. The method of claim 14 further comprising:
providing the beginning portion of the first program to the second subscriber; and
upon completion of providing the beginning portion of the first program to the second subscriber, providing the remaining portion of the first program to the second subscriber.

18. The method of claim 14 wherein the plurality of programs include an audio/video program.

19. The method of claim 14 wherein the plurality of communication channel include at least one RF channel.

20. The method of claim 14 wherein the second request is received after the first request.

21. A method for optimizing utilization of bandwidth in a content delivery system, the content delivery system including a head end configured to transmit a plurality of programs via a plurality of communication channels and a plurality of customer premises equipment each configured to receive the plurality of programs transmitted via the plurality of communication channels from the head end, the method comprising:
receiving a request for a desired program from a subscriber, the desired program having a beginning and an end;
in response to the request,
directing the head end to check whether the desired program is being transmitted via one of the plurality of communication channels, and
directing the head end to determine if there is excess bandwidth in the content delivery system from multiple communication channels;
based on a determination that the desired program is being transmitted via one of the plurality of communication channels, directing the head end to transmit a portion of the desired program, from the beginning of the desired program to a point in the program corresponding to the time the request is received, via a first communication channel to the customer premises equipment associated with the subscriber and directing the customer premises equipment associated with the subscriber to record the remaining portion of the desired program, the remaining portion being from the point in the desired program corresponding to the time the second request is received to the end of the desired program, from the communication channel that has been determined as currently transmitting the desired program; and
directing the head end based on a determination that there is excess bandwidth in the content delivery system from the multiple communication channels to break up the desired program and transmit the desired program collectively over the multiple communication channels having the excess bandwidth.

22. The method of claim 21, wherein each of the plurality of customer premises equipment includes a storage unit, and further comprising:
using the storage unit of the customer premises equipment associated with the subscriber to store the recorded remaining portion of the desired program.

23. The method of claim 22 wherein the storage unit is a hard disk.

24. The method of claim 21 further comprising:
providing the beginning portion of the desired program to the subscriber; and
upon completion of providing the beginning portion of the desired program to the subscriber, providing the remaining portion of the desired program to the subscriber.

25. The method of claim 21 wherein the plurality of programs include an audio/video program.

26. The method of claim 21 wherein the plurality of communication channels include at least one RF channel.

27. A method for optimizing utilization of bandwidth in a content delivery system, comprising:
receiving at time $t_x$ a first request from a first subscriber for a program the program having a beginning and an end;
upon receiving the first request for the program, determining whether there is any excess bandwidth in the content delivery system from one or more communication channels other than a first communication channel;
breaking up the program based on a determination that there is excess bandwidth in the content delivery system from the one or more communication channels and delivering the program to a first subscriber location for viewing by the first subscriber collectively via multiple communication channels including the first communication channel and the one or more communication channels that have excess bandwidth;

receiving at time ($t_x+y$) a second request from a second subscriber for the program;

delivering a beginning portion of the program to a second subscriber location for viewing by the second subscriber via at least a second communication channel, wherein the beginning portion covers a y-duration of the program starting from the beginning of the program;

recording at time ($t_x+y$) the remaining portion of the program from the multiple communication channels; and providing at time ($t_x+2y$) the recorded remaining portion of the program to the second subscriber for viewing.

28. The system of claim 1 wherein, if there is excess bandwidth, the head end breaks up the beginning portion of the program and transmits the beginning portion of the program over multiple communication channels including the second communication channel.

29. The system of claim 8 wherein, if there is excess bandwidth,
- the head end breaks up the beginning portion of the desired program; and
- the second subset of the plurality of communication channels includes multiple channels having excess bandwidth.

30. The method of claim 14 wherein, if there is excess bandwidth, the head end breaks up the beginning portion of the program and transmits the beginning portion of the program over multiple communication channels including the second communication channel.

31. The method of claim 27 wherein, if there is excess bandwidth, the head end breaks up the beginning portion of the program and transmits the beginning portion of the program over multiple communication channels including the second communication channel.

* * * * *

UNITED STATES PATENT AND TRADEMARK OFFICE
CERTIFICATE OF CORRECTION

| | |
|---|---|
| PATENT NO. | : 7,624,415 B1 |
| APPLICATION NO. | : 10/420547 |
| DATED | : November 24, 2009 |
| INVENTOR(S) | : Zhang et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1388 days.

Signed and Sealed this

Twenty-sixth Day of October, 2010

David J. Kappos
*Director of the United States Patent and Trademark Office*